US012632707B2

(12) United States Patent
Zheng et al.

(10) Patent No.: US 12,632,707 B2
(45) Date of Patent: May 19, 2026

(54) TRANSFORMER-BASED GRAPH NEURAL NETWORK TRAINED WITH THREE-DIMENSIONAL DISTANCE DATA

(71) Applicant: Microsoft Technology Licensing, LLC, Redmond, WA (US)

(72) Inventors: Shuxin Zheng, Beijing (CN); Yu Shi, Beijing (CN); Tie-Yan Liu, Beijing (CN); Chang Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1016 days.

(21) Appl. No.: 17/806,076

(22) Filed: Jun. 8, 2022

(65) Prior Publication Data

US 2023/0401430 A1 Dec. 14, 2023

(51) Int. Cl.
| | |
|---|---|
| *G06N 3/04* | (2023.01) |
| *G06N 3/048* | (2023.01) |
| *G06N 3/084* | (2023.01) |

(52) U.S. Cl.
CPC ............. *G06N 3/048* (2023.01); *G06N 3/084* (2013.01)

(58) Field of Classification Search
CPC .................................................. G06N 3/0455
See application file for complete search history.

(56) References Cited

U.S. PATENT DOCUMENTS 11,049,590 B1 * 6/2021 Lee .......................... G06N 3/08

OTHER PUBLICATIONS

Ying et al ("Do Transformers Really Perform Bad for Graph Representation" Dec. 2021) (Year: 2021).*
Hu et al ("OGB-LSC: A Large-Scale Challenge for Machine Learning on Graphs" Oct. 2021) (Year: 2021).*
Zügner, et al., "Language-Agnostic Representation Learning of Source Code from Structure and Context", In Proceedings of International Conference on Learning Representations, Sep. 28, 2020, 22 Pages.

(Continued)

*Primary Examiner* — Lut Wong
(74) *Attorney, Agent, or Firm* — Alleman Hall LLP

(57) ABSTRACT

A computing system is provided, including a processor configured to, during a training phase, provide a training data set including a pre-transformation molecular graph and post-transformation energy parameter value representing an energy change in a molecular system following an energy transformation. The pre-transformation molecular graph includes a plurality of normal nodes fully connected by edges. The processor is configured to encode structural information including a three-dimensional Euclidean distance along an edge connecting a pair of the normal nodes in each molecular graph as learnable embeddings. The processor is configured to input the training data set to a transformer-based graph neural network to train the network to perform an inference at inference time. The processor is further configured to receive inference-time input of the inference-time pre-transformation molecular graph at the trained transformer-based graph neural network, and output the inference-time post-transformation energy parameter value based on the inference-time pre-transformation molecular graph.

19 Claims, 9 Drawing Sheets

(56)                    References Cited

OTHER PUBLICATIONS

Liu, et al., "Swin Transformer: Hierarchical Vision Transformer using Shifted Windows", In Repository of arXiv:2103.14030v1, Mar. 25, 2021, 13 Pages.

Loukas, Andreas, "What Graph Neural Networks Cannot Learn: Depth vs Width", In Proceedings of the International Conference on Learning Representations, Jan. 2020, 17 Pages.

Luo, et al., "Stable, Fast and Accurate: Kernelized Attention with Relative Positional Encoding", In Proceedings of 35th Conference on Neural Information Processing Systems, Dec. 6, 2021, 13 Pages.

Maron, et al., "Provably Powerful Graph Networks", In Proceedings of the 33rd Conference on Neural Information Processing Systems, Dec. 8, 2019, 12 Pages.

Marshall, P. David, "The Promotion and Presentation of the Self: Celebrity as Marker of Presentational Media", In Journal of Celebrity Studies, vol. 1, Issue 1, Mar. 17, 2010, pp. 35-48.

Marwick, Alice, "To See and Be Seen: Celebrity Practice on Twitter", In Journal of Convergence, vol. 17, Issue 2, May 19, 2011, pp. 139-158.

Maziarka, et al., "Molecule Attention Transformer", In Repository of arXiv:2002.08264v1, Feb. 19, 2020, 16 Pages.

Morris, et al., "Weisfeiler and Leman Go Neural: Higher-Order Graph Neural Networks", In Proceedings of the 33rd AAAI Conference on Artificial Intelligence, vol. 33, Issue 01, Jul. 17, 2019, pp. 4602-4609.

Nakata, et al., "PubChemQC Project: A Large-Scale First-Principles Electronic Structure Database for Data-Driven Chemistry", In Journal of Chemical Information and Modeling, vol. 57, Issue 6, May 8, 2017, pp. 1300-1308.

Narang, et al., "Do Transformer Modifications Transfer Across Implementations and Applications?", In Repository of arXiv:2102.11972v2, Sep. 10, 2021, 16 Pages.

Peng, et al., "How could Neural Networks understand Programs?", In Proceedings of the 38th International Conference on Machine Learning, Jul. 18, 2021, 11 Pages.

Raffel, et al., "Exploring the Limits of Transfer Learning with a Unified Text-to-Text Transformer", In Journal of Machine Learning Research, vol. 21, Issue 140, Jun. 2020, 67 Pages.

Rong, et al., "Self-Supervised Graph Transformer on Large-Scale Molecular Data", In Proceedings of Advances in Neural Information Processing Systems, vol. 33, Dec. 6, 2020, 13 Pages.

Sato, et al., "Random Features Strengthen Graph Neural Networks", In SIAM International Conference on Data Mining, 2021, pp. 333-341.

Shaw, et al., "Self-Attention with Relative Position Representations", In Proceedings of the Conference of the North American Chapter of the Association for Computational Linguistics: Human Language Technologies, vol. 2 (Short Papers), Jun. 1, 2018, pp. 464-468.

Shi, et al., "Benchmarking Graphormer on Large-Scale Molecular Modeling Datasets", In Repository of arXiv:2203.04810v1, Mar. 9, 2022, 5 Pages.

Shi, et al., "Masked Label Prediction: Unified Message Passing Model for Semi-Supervised Classification", In Repository of arXiv:2009.03509v4, Oct. 15, 2020, 9 Pages.

Shuaibi, et al., "Rotation Invariant Graph Neural Networks using Spin Convolutions", In Repository of arXiv:2106.09575v1, Jun. 17, 2021, 13 Pages.

Vaswani, et al., "Attention Is All You Need", In Proceedings of 31st Conference on Neural Information Processing Systems, Dec. 2017, 11 Pages.

Velickovic, et al., "Graph Attention Networks", In Proceedings of the 6th International Conference on Learning Representations, Apr. 30, 2018, 12 Pages.

Wang, et al., "Direct Multi-Hop Attention Based Graph Neural Network", In Repository of arXiv:2009.14332v3, Oct. 2, 2020, 15 Pages.

Wang, et al., "Linformer: Self-Attention with Linear Complexity.", In Repository of arXiv:2006.04768v3, Jun. 14, 2020, 12 Pages.

Xiong, et al., "On Layer Normalization in the Transformer Architecture", In Proceedings of International Conference on Machine Learning, Jul. 13, 2020, 10 Pages.

Xu, et al., "How Powerful are Graph Neural Networks?", In Proceedings of International Conference on Learning Representation, May 6, 2019, 17 Pages.

Yang, et al., "Breaking the Expressive Bottlenecks of Graph Neural Networks", In Repository of arXiv:2012.07219v1, Dec. 14, 2020, 20 Pages.

Yang, et al., "SPAGAN: Shortest Path Graph Attention Network", In Proceedings of the Twenty-Eighth International Joint Conference on Artificial Intelligence, Aug. 10, 2019, pp. 4099-4105.

Ying, et al., "Do Transformers Really Perform Bad for Graph Representation?", In Repository of arXiv:2106.05234v5, Nov. 24, 2021, 19 Pages.

Ying, et al., "First Place Solution of KDD Cup 2021 & OGB Large-Scale Challenge Graph Prediction Track", In Repository of arXiv:2106.08279v3, Jun. 20, 2021, 6 Pages.

Ying, et al., "Lazyformer: Self Attention with Lazy Update", In Repository of arXiv:2102.12702v1, Feb. 25, 2021, 9 Pages.

You, et al., "Position-aware Graph Neural Networks", In Proceedings of the 36th International Conference on Machine Learning, Jun. 9, 2019, 10 Pages.

Yun, et al., "Graph Transformer Networks", In Proceedings of the 33rd Conference on Neural Information Processing Systems, Dec. 8, 2019, 11 Pages.

Zhang, et al., "Graph-Bert: Only Attention is Needed for Learning Graph Representations", In Repository of arXiv:2001.05140v2, Jan. 22, 2020, 10 Pages.

Zheng, et al., "Graphormer", Retrieved from: https://github.com/Microsoft/Graphormer, Mar. 17, 2022, 4 Pages.

Zhu, et al., "FreeLB: Enhanced Adversarial Training for Natural Language Understanding", In Proceedings of 8th International Conference on Learning Representations, Apr. 26, 2020, 14 Pages.

Zitnick, et al., "An Introduction to Electrocatalyst Design using Machine Learning for Renewable Energy Storage", In Repository of arXiv:2010.09435v1, Oct. 14, 2020, 27 Pages.

Censor-Hillel, et al., "Algebraic Methods in the Congested Clique", In Journal of Distributed Computing, vol. 32, Issue 6, Dec. 2019, 10 Pages.

"Baseline Code for PCQM4M", Retrieved from: https://github.com/snap-stanford/ogb/tree/master/examples/lsc/pcqm4m, May 14, 2022, 4 Pages.

"Leaderboards for Graph Property Prediction", Retrieved from: https://web.archive.org/web/20220204000150/https://ogb.stanford.edu/docs/leader_graphprop/, Feb. 4, 2022, 11 Pages.

"Ogbg_mol", Retrieved from: https://github.com/lightaime/deep_gons_torch/tree/master/examples/ogb/ogbg_mol#train, Jun. 19, 2021, 3 Pages.

"OGB-LSC @ KDD Cup 2021 _ Open Graph Benchmark", Retrieved from: https://ogb.stanford.edu/kddcup2021/pcqm4m/, 2021, 6 Pages.

"Open Catalyst Project", Retrieved from: https://web.archive.org/web/20220326051710/https://opencatalystproject.org/index.html, Mar. 26, 2022, 6 pages.

"RDKit: Open-Source Cheminformatics Software", Retrieved From: https://www.rdkit.org/, Retrieved on Mar. 16, 2022, 1 Page.

Abboud, et al., "The Surprising Power of Graph Neural Networks with Random Node Initialization", In Proceedings of the 30th International Joint Conference on Artificial Intelligence, May 4, 2021, pp. 2112-2118.

Baek, et al., "Accurate Learning of Graph Representations with Graph Multiset Pooling", In Proceedings of the Ninth International Conference on Learning Representations, May 3, 2021, 22 Pages.

Balcilar, et al., "Breaking the Limits of Message Passing Graph Neural Networks", In Proceedings of the International Conference on Machine Learning, Jul. 1, 2021, 10 Pages.

Beaini, et al., "Directional Graph Networks", In Proceedings of the 38th International Conference on Machine Learning, Jul. 1, 2021, 11 Pages.

Belkin, et al., "Laplacian Eigenmaps for Dimensionality Reduction and Data Representation", In Journal of Neural Computation, vol. 15, Issue 6, Jun. 1, 2003, pp. 1373-1396.

(56) References Cited

OTHER PUBLICATIONS

Bresson, et al., "Residual Gated Graph ConvNets", In Repository of arXiv:1711.07553v1, Nov. 20, 2017, 10 Pages.

Brossard, et al., "Graph Convolutions That Can Finally Model Local Structure", In Repository of arXiv:2011.15069v1, Nov. 30, 2020, 11 Pages.

Brown, et al., "Language Models are Few-Shot Learners", In 34th Conference on Neural Information Processing Systems, 2020, 25 Pages.

Cai, et al., "Graph Transformer for Graph-to-Sequence Learning", In Proceedings of The Thirty-Fourth AAAI Conference on Artificial Intelligence, Apr. 3, 2020, pp. 7464-7471.

Cai, et al., "GraphNorm: A Principled Approach to Accelerating Graph Neural Network Training", In Proceedings of the 38th International Conference on Machine Learning, Jul. 1, 2021, 12 Pages.

"Graphormer Wins the Open Catalyst Challenge and Upgrades to AI for Molecular Simulation Toolkit", Retrieved from: https://www.microsoft.com/en-us/research/lab/microsoft-research-asia/articles/graphormer-wins-the-open-catalyst-challenge-and-upgrades-to-ai-for-molecular-simulation-toolkit/, Jan. 11, 2022, 5 Pages.

Chanussot, et al., "The Open Catalyst 2020 (OC20) Dataset and Community Challenges", In Repository of arXiv:2010.09990v1, Oct. 20, 2020, 28 Pages.

Chen, et al., "Path-Augmented Graph Transformer Network", In Repository of arXiv:1905.12712v1, May 29, 2019, 5 Pages.

Corso, et al., "Principal Neighbourhood Aggregation for Graph Nets", In Journal of Advances in Neural Information Processing Systems, vol. 33, Dec. 6, 2020, 12 Pages.

Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.

Dolev, et al., ""Tri, Tri Again": Finding Triangles and Small Subgraphs in a Distributed Setting", In Proceedings of the 26th International Conference on Distributed Computing, Jan. 2012, 2 Pages.

Dosovitskiy, et al., "An Image is Worth 16x16 Words: Transformers for Image Recognition at Scale", In Repository of arXiv:2010.11929v1, Oct. 22, 2020, 21 Pages.

Drucker, et al., "On the Power of the Congested Clique Model", In ACM Symposium on Principles of Distributed Computing, Jul. 15, 2014, pp. 367-376.

Dwivedi, et al., "A Generalization of Transformer Networks to Graphs", In Journal of AAAI Workshop on Deep Learning on Graphs: Methods and Applications, Feb. 8, 2021, 8 Pages.

Dwivedi, et al., "Benchmarking Graph Neural Networks", In Repository of arXiv:2003.00982v1, Mar. 2, 2020, 20 Pages.

Gilmer, et al., "Neural Message Passing for Quantum Chemistry", In Proceedings of the 34th International Conference on Machine Learning, Jul. 17, 2017, 10 Pages.

Godwin, et al., "Simple GNN Regularisation for 3D Molecular Property Prediction and Beyond", In Proceedings of the International Conference of Representation Learning, Apr. 25, 2022, 23 Pages.

Gong, et al., "Exploiting Edge Features for Graph Neural Networks", In Proceedings of the IEEE/CVF Conference on Computer Vision and Pattern Recognition, Jun. 15, 2019, pp. 9211-9219.

Gulati, et al., "Conformer: Convolution-Augmented Transformer for Speech Recognition", In Repository of arXiv:2005.08100v1, May 16, 2020, 5 Pages.

Hamilton, et al., "Inductive Representation Learning on Large Graphs", In Proceeding of 31st Conference on Neural Information Processing Systems, Dec. 4, 2017, 11 Pages.

Hellendoorn, et al., "Global Relational Models of Source Code", In Proceedings of International Conference on earning Representations, Sep. 26, 2019, 12 Pages.

Hu, et al., "Heterogeneous Graph Transformer", In Proceedings of The Web Conference, Apr. 20, 2020, pp. 2704-2710.

Hu, et al., "OGB-LSC: A Large-Scale Challenge for Machine Learning on Graphs", In Repository of arXiv:2103.09430v1, Mar. 17, 2021, 10 Pages.

Hu, et al., "Open Graph Benchmark: Datasets for Machine Learning on Graphs", In Computer Repository of https://arxiv.org/pdf/2005.00687v1.pdf, May 2, 2020, 23 Pages.

Hu, et al., "Strategies for Pre-Training Graph Neural Networks", In Proceedings of 8th International Conference on Learning Representations, Apr. 26, 2020, 22 Pages.

Ishiguro, et al., "Graph Warp Module: an Auxiliary Module for Boosting the Power of Graph Neural Networks in Molecular Graph Analysis", In Repository of arXiv:1902.01020v4, May 24, 2019, 16 Pages.

Jumper, et al., "Highly Accurate Protein Structure Prediction with AlphaFold", In Journal of Nature, vol. 596, Aug. 26, 2021, 12 Pages.

Jurdzinski, et al., "MST in 0(1) Rounds of Congested Clique", In ACM-SIAM Symposium on Discrete Algorithms, Jan. 2018, pp. 2620-2632.

Ke, et al., "Rethinking Positional Encoding in Language Pre-training", In Proceedings of the 9th International Conference on Learning Representations, May 3, 2021, 14 Pages.

Kipf, et al., "Semi-Supervised Classification with Graph Convolutional Networks", In Repository of arXiv:1609.02907v1, Sep. 9, 2016, 10 Pages.

Kong, et al., "FLAG: Adversarial Data Augmentation for Graph Neural Networks", In Repository of arXiv:2010.09891v1, Oct. 19, 2020, 14 Pages.

Kreuzer, et al., "Rethinking Graph Transformers with Spectral Attention", In Repository of arXiv:2106.03893v2, Jun. 9, 2021, 18 Pages.

Le, et al., "Parameterized Hypercomplex Graph Neural Networks for Graph Classification", In Repository of arXiv:2103.16584v1, Mar. 30, 2021, 22 Pages.

Li, et al., "DeeperGCN: All You Need to Train Deeper GCNs", In Repository of arXiv:2006.07739v1, Jun. 13, 2020, 16 Pages.

Li, et al., "Distance Encoding: Design Provably More Powerful Neural Networks for Graph Representation Learning", In Proceedings of 34th Conference on Neural Information Processing Systems, Dec. 6, 2020, 14 Pages.

Li, et al., "Graph Transformer", In International Conference on Learning Representations, May 6, 2019, 14 Pages.

Li, et al., "Learning Graph-Level Representation for Drug Discovery", In Repository of arXiv:1709.03741v1, Sep. 12, 2017, 7 Pages.

Lin, et al., "Multi-Hop Knowledge Graph Reasoning with Reward Shaping", In Repository of arXiv:1808.10568v2, Sep. 11, 2018, 12 pages.

Liu, et al., "RoBERTa: A Robustly Optimized BERT Pretraining Approach", In Repository of arXiv:1907.11692, Jul. 26, 2019, 13 Pages.

* cited by examiner

TABLE 1

| Case | #params. | MAE on PCQv1 | | MAE on PCQv2 | |
|------|----------|--------------|--------|--------------|--------|
| | | train. | valid. | train. | valid. |
| PreLN$_{Base}$ | 48.3M | 0.0266 | 0.1229 | 0.0266 | 0.0889 |
| PostLN$_{Base}$ | 48.3M | 0.0416 | 0.1193 | 0.0348 | 0.0864 |
| | | | | | |
| | | | | | |

FIG. 7

TABLE 2

| Case | Energy MAE (eV) on IS2RE Task (Direct) | | | | |
|------|-----|----------|----------|----------|------|
| | ID | OOD Ads. | OOD Cat. | OOD Both | avg. |
| Graphormer$_{Base*}$ | 0.4329 | 0.5850 | 0.4441 | 0.5299 | 0.4980 |
| Graphormer$_{Base}$ (ensemble) | 0.3976 | 0.5719 | 0.4166 | 0.5029 | 0.4722 |

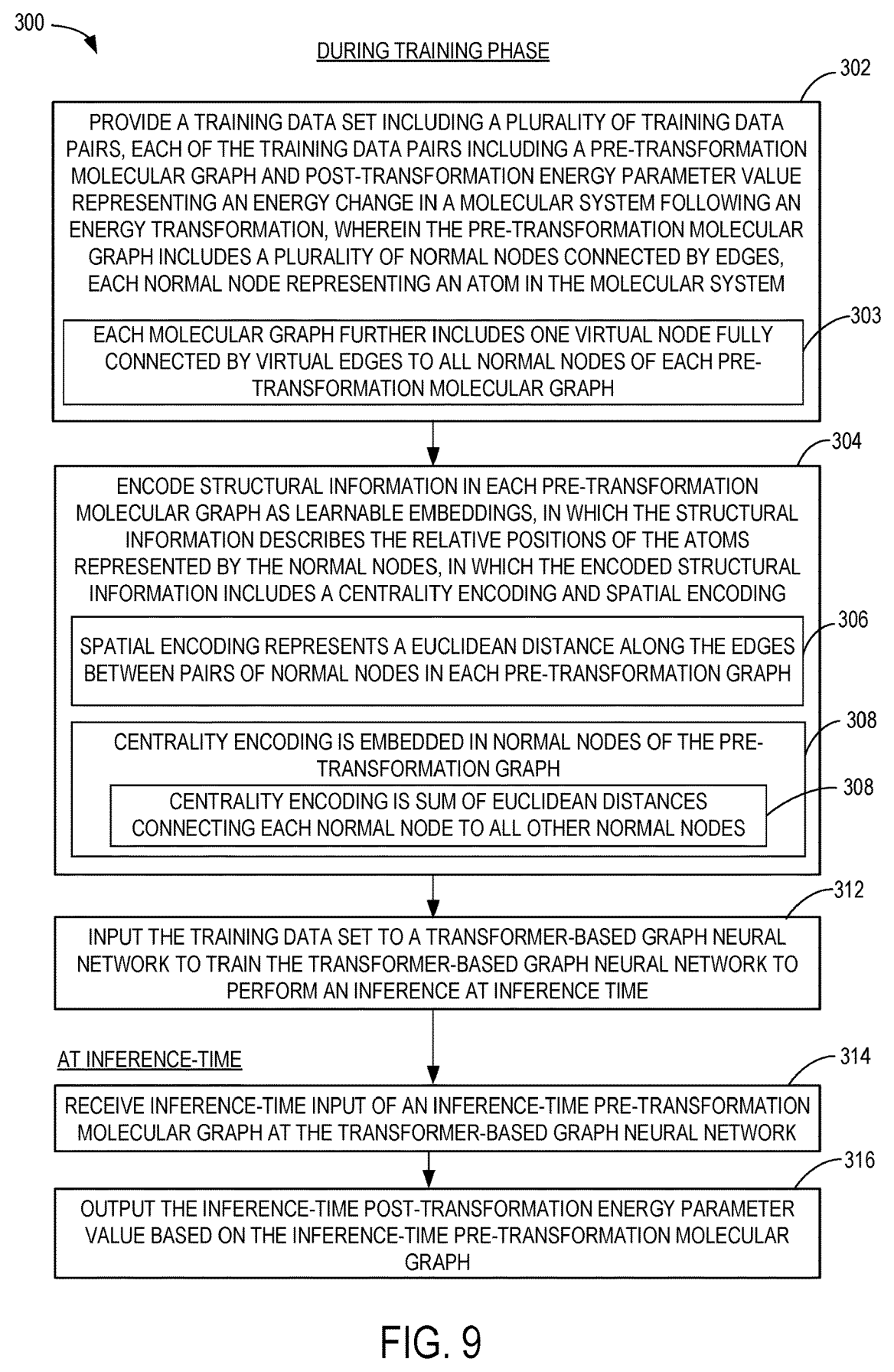

DURING TRAINING PHASE

┌─ 302

PROVIDE A TRAINING DATA SET INCLUDING A PLURALITY OF TRAINING DATA PAIRS, EACH OF THE TRAINING DATA PAIRS INCLUDING A PRE-TRANSFORMATION MOLECULAR GRAPH AND POST-TRANSFORMATION ENERGY PARAMETER VALUE REPRESENTING AN ENERGY CHANGE IN A MOLECULAR SYSTEM FOLLOWING AN ENERGY TRANSFORMATION, WHEREIN THE PRE-TRANSFORMATION MOLECULAR GRAPH INCLUDES A PLURALITY OF NORMAL NODES CONNECTED BY EDGES, EACH NORMAL NODE REPRESENTING AN ATOM IN THE MOLECULAR SYSTEM

┌─ 303

EACH MOLECULAR GRAPH FURTHER INCLUDES ONE VIRTUAL NODE FULLY CONNECTED BY VIRTUAL EDGES TO ALL NORMAL NODES OF EACH PRE-TRANSFORMATION MOLECULAR GRAPH

┌─ 304

ENCODE STRUCTURAL INFORMATION IN EACH PRE-TRANSFORMATION MOLECULAR GRAPH AS LEARNABLE EMBEDDINGS, IN WHICH THE STRUCTURAL INFORMATION DESCRIBES THE RELATIVE POSITIONS OF THE ATOMS REPRESENTED BY THE NORMAL NODES, IN WHICH THE ENCODED STRUCTURAL INFORMATION INCLUDES A CENTRALITY ENCODING AND SPATIAL ENCODING

┌─ 306

SPATIAL ENCODING REPRESENTS A EUCLIDEAN DISTANCE ALONG THE EDGES BETWEEN PAIRS OF NORMAL NODES IN EACH PRE-TRANSFORMATION GRAPH

┌─ 308

CENTRALITY ENCODING IS EMBEDDED IN NORMAL NODES OF THE PRE-TRANSFORMATION GRAPH

┌─ 308

CENTRALITY ENCODING IS SUM OF EUCLIDEAN DISTANCES CONNECTING EACH NORMAL NODE TO ALL OTHER NORMAL NODES

┌─ 312

INPUT THE TRAINING DATA SET TO A TRANSFORMER-BASED GRAPH NEURAL NETWORK TO TRAIN THE TRANSFORMER-BASED GRAPH NEURAL NETWORK TO PERFORM AN INFERENCE AT INFERENCE TIME

AT INFERENCE-TIME                                           ┌─ 314

RECEIVE INFERENCE-TIME INPUT OF AN INFERENCE-TIME PRE-TRANSFORMATION MOLECULAR GRAPH AT THE TRANSFORMER-BASED GRAPH NEURAL NETWORK

┌─ 316

OUTPUT THE INFERENCE-TIME POST-TRANSFORMATION ENERGY PARAMETER VALUE BASED ON THE INFERENCE-TIME PRE-TRANSFORMATION MOLECULAR GRAPH

FIG. 9

TRANSFORMER-BASED GRAPH NEURAL NETWORK TRAINED WITH THREE-DIMENSIONAL DISTANCE DATA

BACKGROUND

In the field of computational chemistry, computer-based techniques have been developed to predict molecular properties through computer simulations. These molecular properties can have a wide-ranging impact on the appearance and function of a molecule or material, and thus are of keen interest in a wide variety of fields. For example, in the field of drug design, changes in molecular properties can affect the efficacy of a drug. In the field of drug discovery, molecular properties can affect the potential for a material found in nature to be used for therapeutic purposes. In the field of quantum chemistry, quantum-mechanical calculation of electronic contributions to physical and chemical properties of molecules and materials is a fundamental area of inquiry. As discussed below, opportunities remain for improvements in computational methods for predicting molecular properties, which would have application beyond the field of computational chemistry.

SUMMARY

To address the issues discussed herein, computerized systems and methods are provided. In one aspect, the computerized system includes a processor configured to, during a training phase, provide a training data set including a plurality of training data pairs, each of the training data pairs including a pre-transformation molecular graph and post-transformation energy parameter value representing an energy change in a molecular system following an energy transformation, in which the pre-transformation molecular graph includes a plurality of normal nodes fully connected by edges, each normal node representing an atom in the molecular system. The processor is further configured to encode structural information in each molecular graph as learnable embeddings, the structural information describing the relative positions of the atoms represented by the normal nodes, the structural information including a three-dimensional Euclidean distance along an edge connecting a pair of the normal nodes in each pre-transformation molecular graph. The processor is further configured to input the training data set to a transformer-based graph neural network to thereby train the transformer-based graph neural network to perform an inference at inference time. To perform the inference at inference time, the processor is further configured to receive inference-time input of the inference-time pre-transformation molecular graph at the trained transformer-based graph neural network, and output the inference-time post-transformation energy parameter value based on the inference-time pre-transformation molecular graph.

These techniques are not limited to molecular graphs, but may be applied to other types of graphs that contain structural information. For example, these techniques may be applied to a social graph that models a social network, a map that models a network of locations, or a knowledge graph that models knowledge sources connected by references, as some examples.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7-8 are tables illustrating the performance of the system of FIG. 1 on different datasets.

FIG. 9 shows a flowchart of a computerized method according to one example implementation of the present disclosure.

DETAILED DESCRIPTION

Figure 1:
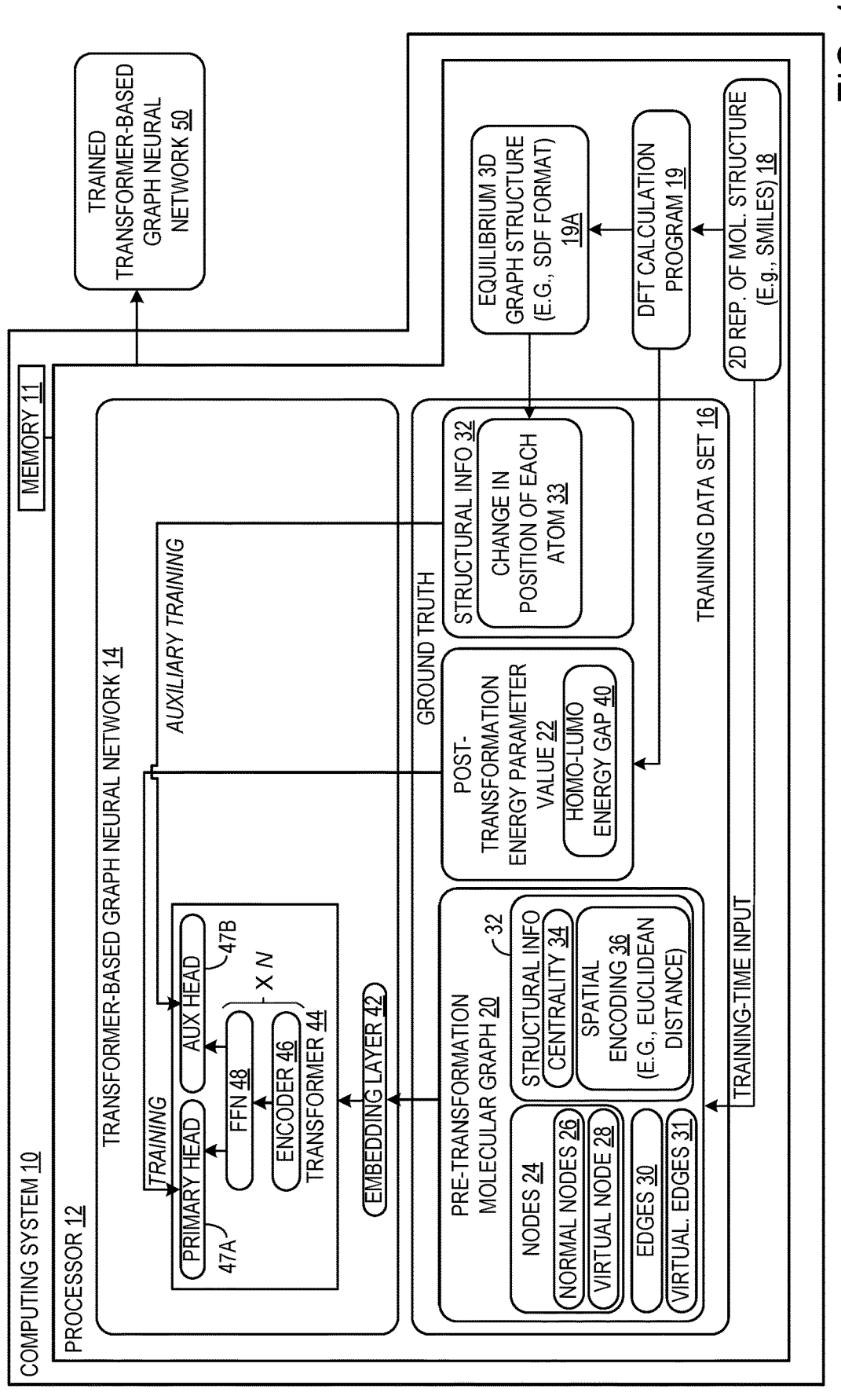
FIG. 1 shows a schematic view of a computing system including a transformer-based graph neural network, during a training phase in which a training data set is used to train the transformer-based graph neural network to perform an inference at inference time, according to one example implementation of the present disclosure.

Computer-based techniques have been developed to predict molecular properties through computer simulations. For example, Density Functional Theory (DFT) is a powerful and widely used quantum physics calculation technique that can in many cases accurately predict various molecular properties such as the shape of molecules, reactivity, responses by electromagnetic fields, etc. However, DFT is time-consuming and computationally intensive, often taking up to several hours even for a single model of a simple molecule on a conventional processor. For many complex systems, computing exact DFT solutions is not practical on current hardware. This currently presents a barrier to predicting molecular properties.

Design Principles

In view of the issues discussed above, a computing system utilizing a transformer-based graph neural network is provided. The computing system has applicability to predicting molecular properties of molecular systems, as well as to predicting other parameters of other types of systems that can be represented as graphs. The following discussion provides an overview of the theoretical underpinnings and design principles upon which the transformer-based graph neural network has been conceived. This discussion is followed by a detailed description of specific example embodiments of a transformer-based graph neural network.

The transformer-based graph neural network according to the present disclosure is trained using deep learning techniques to receive a graph as input and output a predicted scalar value. The graph may take the form G=(V, E), which denotes a graph G having nodes V and edges E, where $V=\{v_1, v_2, \ldots, v_n\}$, n=|V| is the number of nodes. A feature vector may be provided for each node. For example, the feature vector of node $v_i$ is denoted $x_i$. Feature vectors encode features of each node.

The transformer-based graph neural network may follow a learning schema that iteratively updates the representation of a node in a pre-transformation molecular graph by aggregating representations of its first or higher-order neighbors. Herein, $$h_i^{(l)}$$

is the representation of $v_i$ at the l-th layer and $$h_i^{(0)} = x_i.$$

The l-th iteration of aggregation could be characterized by an AGGREGATE-COMBINE step as follows:

$$a_i^{(l)} = \text{AGGREGATE}^{(l)}(\{h_j^{(l-1)}: j \in \mathcal{N}(v_i)\}), h_i^{(l)} = \text{COMBINE}^{(l)}(h_i^{(l-1)}, a_i^{(l)}) \tag{1}$$

wherein $\mathcal{N}(v_i)$ is the set of first or higher-order neighbors of $v_i$. The AGGREGATE function is used to gather the information from neighbors. Suitable aggregation functions include MEAN, MAX, SUM. The goal of the COMBINE function is to fuse the information from neighbors into the node representation. In addition, for graph representation tasks, a READOUT function is designed to aggregate node features $$h_i^{(L)}$$

of the final iteration into the representation h G of the entire graph G:

$$h_G = \text{READOUT}(\{h_i^{(L)}|v_i \in G\}) \tag{2}$$

READOUT can be implemented by a simple permutation invariant function such as summation or a graph-level pooling function, for example.

The transformer architecture of the transformer-based graph neural network of the present disclosure may include one or more transformer layers. Each transformer layer has two parts: a self-attention module and a position-wise feed-forward network (FFN).

$$H = [h_1^T, \ldots, h_n^T]^T \in R^{n \times d}$$

denotes the input of self-attention module where d is the hidden dimension and $h_i \in R^{1 \times d}$ is the hidden representation at position i. The input H is projected by three matrices $W_Q \in R^{d \times d_K}$, $W_K \in R^{d \times d_K}$ and $W_V \in R^{d \times d_V}$ to the corresponding representations Q, K, V. The self-attention is calculated as:

$$Q = HW_Q, K = HW_K, V = HW_V \tag{3}$$

$$A = \frac{QK^T}{\sqrt{d_K}}, Attn(H) = softmax(A)V \tag{4}$$

where A is a matrix capturing the similarity between queries and keys. For simplicity, a single-head self-attention is described, and it is assumed that dK=dV=d. However, in practice a multi-head attention layer may be used. Bias terms are omitted for simplicity of explanation.

In Eq.4, the attention distribution is calculated based on the semantic correlation between nodes. However, node centrality, which can measure how important a node is in the graph, can be a strong signal for graph understanding. Such information is neglected in conventional attention calculations for graph neural networks. In the transformer-based graph neural network of the present disclosure, centrality may be calculated in terms of the degree of each node. In one specific example, a centrality encoding is utilized that assigns to each node two real-valued embedding vectors according to the indegree and outdegree of the node. As the centrality encoding is applied to each node, it is added to the vector of node features, as follows.

$$h_i^{(0)} = x_i + z_{deg^-(v_i)}^- + z_{deg^+(v_i)}^+ \tag{5}$$

where $z^-$, $z^+ \in R^d$ are learnable embedding vectors specified by the indegree $deg^-(v_i)$ and outdegree $deg^+(v_i)$ respectively. For undirected graphs, $deg^-(v_i)$ and outdegree $deg^+(v_i)$ could be unified to $deg(v_i)$. By using centrality encoding in the input, the softmax attention can catch the node importance signal in the queries and the keys. Therefore, the trained model can capture both the semantic correlation and the node importance, based on its centrality, in the attention mechanism.

An advantage of the transformer architecture is its global receptive field. In each transformer layer, each token can attend to the information at any position and then process its representation. But this operation has a problematic byproduct that the model has to explicitly specify different positions or encode the positional dependency (such as locality) in the layers. For sequential data, such as sentences of words, the transformer input can be labeled with sequence position using an embedding (i.e., absolute positional encoding) or the transformer input can be encoded with the relative distance of any two positions (i.e., relative positional encoding).

However, for graphs, nodes are not arranged as a sequence. They can lie in a multi-dimensional spatial space and are linked by edges. To encode the structural information of a graph in the transformer-based graph neural network of the present disclosure, spatial encoding is utilized. Concretely, for any graph G, a function $\emptyset(v_i, v_j)$: $V \times V \to R$ measures the spatial relation between $v_i$ and $v_j$ in graph G. The function $\emptyset$ can be defined by the connectivity between the nodes in the graph. Herein, $\emptyset(v_i, v_j)$ represents the distance between $v_i$ and $v_j$ if the two nodes are connected. Typically, the distance is expressed as the shortest path distance (SPD), which may be expressed in terms of the number of edges on the shortest path, or may be weighted according to edge weights for each edge along the path. If not, the output of $\emptyset$ is set to be a predetermined value, i.e., $-1$. Each (feasible) output value is assigned a learnable scalar which will serve as a bias term in the self-attention module. Denoting $A_{ij}$ as the (i, j)-element of the Query-Key product matrix A, the following expression may be obtained:

$$A_{ij} = \frac{(h_i W_Q)(h_i W_K)^T}{\sqrt{d}} + b_{\emptyset(v_i, v_j)} \tag{6}$$

where $b_{\emptyset(v_i, v_j)}$ is a learnable scalar indexed by $\emptyset(v_i, v_j)$, and shared across all layers.

There are several technical benefits of the proposed transformer-based graph neural network described herein. First, compared to conventional graph neural networks, where the receptive field is restricted to neighbors, as shown in Eq. (6), the transformer layer provides global information such that each node can attend to all other nodes in the graph. Second, by using $b_{\emptyset(v_i, v_j)}$, each node in a single transformer layer can adaptively attend to all other nodes according to the graph structural information. For example, if $b_{\emptyset(v_i, v_j)}$ is learned to be a decreasing function with respect to $\emptyset(v_i, v_j)$, for each node, the model will likely pay more attention to the nodes near it and pay less attention to the nodes far away from it.

In many graph tasks, edges also have structural features, e.g., in a molecular graph, atom pairs may have features describing the type of bond between them. To capture this structural information, edge encoding may be used. There are two conventional edge encoding methods, each with its attendant technical drawbacks. In the first method, the edge features are added to the associated nodes' features. In the second method, for each node, its associated edges' features will be used together with the node features in the aggregation. However, such ways of using edge feature only propagate the edge information to its associated nodes, and thus the attention that can be given to those features is limited. As a result, the whole graph may fail to learn sufficiently from such edge information.

To better encode edge features into the attention layers, transformer-based graph neural network of the present disclosure may utilize the following edge encoding method. The attention mechanism estimates correlations for each node pair $(v_i, v_j)$, and the edges connecting them should be considered in the correlation. For each ordered node pair $(v_i, v_j)$, a shortest path $SP_{ij} = (e_1, e_2, \ldots, e_N)$ from $v_i$ to $v_j$ is determined, and an average of the dot-products of the edge feature and a learnable embedding along the path is calculated. This method of edge encoding incorporates edge features via a bias term to the attention module. Concretely, the (i, j)-element of A in Eq. (3) is modified further with the edge encoding $c_{ij}$ as:

$$A_{ij} = \frac{(h_i W_Q)(h_i W_K)^T}{\sqrt{d}} + b_{\emptyset(v_i, v_j)} + c_{ij}, \tag{7}$$

-continued $$\text{where } c_{ij} = \frac{1}{N} \sum_{n=1}^{N} x_{e_n} (\omega_n^E)^T$$

where $x_{e_n}$ is the feature of the n-th edge $e_n$ in $SP_{ij}$, $$\omega_n^E \in R^{d_E}$$

is the n-th weight embedding, and $d_E$ is the dimensionality of edge feature.

Layer normalization (LN) may be applied before the multi-head self-attention (MHA) and the feed-forward blocks (FFN) instead of after. This modification leads to more effective optimization. In particular, for the FFN sub-layer, the dimensionality of input, output, and the inner-layer(s) are set to the same dimension d. We formally characterize the transformer layer as follows:

$$h'^{(l)} = MHA(LN(h^{(l-1)})) + h^{(l-1)} \tag{8}$$

$$h^{(l)} = FFN(LN(h'^{(l)})) + h'^{(l)} \tag{9}$$

A predetermined node referred to as a virtual node [VNode] is added to the graph, and the virtual node is connected to each other normal node in the graph individually (i.e., is fully connected by unique edges). In the AGGREGATE-COMBINE step, the representation of [VNode] has been updated as normal nodes in graph, and the representation of the entire graph hG would be the node feature of the virtual node in the final layer. Since the virtual node is connected to all other nodes in graph, the distance of the shortest path is 1 (assuming no weighting) for any $\emptyset([VNode], v_j)$ and $\emptyset(v_i, [VNode])$, although the connection is not physical. To distinguish the connection of physical and virtual edges, all spatial encodings for $b_{\emptyset([VNode], v_j)}$ and $b_{\emptyset(v_i, [VNode])}$ are reset to a distinct learnable scalar.

The design principles discussed above may be extended to three-dimensional (3D) molecular modeling with certain modifications, as follows. It will be appreciated that a molecule can be represented by a 3D molecular graph G=(V, P), where $V = \{v_1, v_2, \ldots, v_n\}$ denotes the set of atoms, each of which holding a feature vector $x_i$, and $P = \{r_1, r_2, \ldots, r_n\}$ is the set of 3D Cartesian coordinates of atoms which contains 3D spatial information. To handle such a 3D molecular graph as input, the design principles discussed above are modified such that the spatial encoding $\emptyset(v_i, v_j)$ is set to be the Euclidean distance between $v_i$ and $v_j$. Further, a set of Gaussian basis functions is used to encode $\emptyset(v_i, v_j)$ in order to model the spatial relation between atoms, instead of using a shortest path distance between two nodes as the spatial encoding. Second, the centrality encoding for each node is set to be the sum of all spatial encodings of the respective node, instead of a degree of the node as the centrality encoding.

Figure 5:
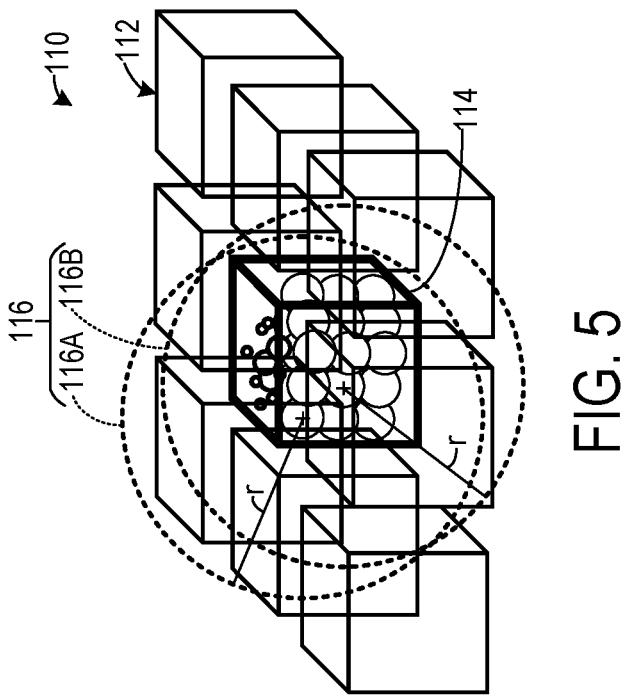
FIG. 5 is a schematic illustration of a molecular system with a periodically repeating structure, which is modeled using a periodic boundary condition for the pre-transformation molecular graph of the computing system of FIG. 1.

In addition, the system is modified to include a periodic boundary condition (PBC) to limit calculations. A periodic boundary condition is a boundary condition found in repeating molecular structures, for example crystal systems, in which a set of atoms in a 3D unit cell is periodically repeated in a plane or throughout three-dimensional space. A radius graph with a periodic boundary condition may be constructed to capture the local 3D structure surrounding each atom, where the replicated atoms among different unit cells are reduced to a single atom, but this representation may result in multiple edges between two atoms (i.e., a multigraph). Since message passing is done by attention layers in the present system, instead of constructing a multigraph, the transformer-based graph neural network according to the present configuration duplicates all atoms that lie within a cutoff distance in multiple repeated cells, as illustrated in FIG. 5 and discussed below.

In addition, in this alternative configuration of the transformer-based graph neural network, a modified attention layer is included that replaces a single node-level projection head, with both a primary attention head for outputting a scalar value indicating an energy level, and an auxiliary attention head that generates 3D outputs. Concretely, the attention probability in a standard self-attention layer is decomposed into three directions by multiplying the normalized relative position offset $$\frac{r_{ij}}{\|r_{ij}\|}$$

$\in R^3$ between query and key atoms. Then three linear projection heads are applied to each component of the 3D attention layer output in the three directions respectively. One technical advantage of such a configuration is that it can maintain rotational equivariance of the final estimation layer of the model by sharing the parameters of the three linear projections.

Example Embodiments

In accordance with principles discussed above, a specific example embodiment of a transformer-based graph neural network according to the present disclosure will now be described, with reference to FIGS. 1-10. FIG. 1 shows a schematic view of a computing system 10 including a transformer-based graph neural network 14, during a training phase in which a training data set 16 is used to train the transformer-based graph neural network 14 to perform an inference at inference time, according to one example implementation of the present disclosure. The computing system 10 may include one or more processors 12 configured to execute instructions using associated memory 11 to perform the functions and processes of the computing system 10 described herein. For example, the computing system 10 may include a cloud server platform including a plurality of server devices, and the one or more processors 12 may be one processor of a single server device, or multiple processors of multiple server devices. The computer system 10 may also include one or more client devices in communication with the server devices, and one or more of processors 12 may be situated in such a client device. Below, the functions of computing system 10 as executed by processor 12 are described by way of example, and this description shall be understood to include execution on one or more processors distributed among one or more of the devices discussed above.

Computing system 10 is configured to, during a training phase, train the transformer-based graph neural network 14 to perform an inference at inference time. Initially, the computing system 10 is configured to obtain or produce a 2D representation of molecular structure 18 in a format such as the SMILES (Simplified Molecular Input Line Entry System) format. Based on the 2D representation of molecular structure 18, the processor 12 of the computing system 10 is configured to provide, e.g., by computationally generating or reading from a stored location in memory, a training data set 16 including a plurality of training data pairs. Each of the training data pairs includes a pre-transformation molecular graph 20, along with (a) a ground truth post-transformation energy parameter value 22 representing an energy change in a molecular system following an energy transformation which may be due to molecular relaxation of the molecular system, and (b) ground truth structural information 32 which may be in the form of a change in position 33 of each atom in the molecular system due to the molecular relaxation of the molecular system. In one specific example, the transformation energy parameter value 22 may be a value indicating a HOMO-LUMO energy gap 40. Other ground truth energy parameter values 22 and other types of ground truth structural information 32 are also contemplated, as are applications to graph systems other than molecular systems, as described below. The ground truth information is used to train the transformer-based graph neural network 14, with the post-transformation energy parameter value 22 being used to train a primary attention head 47A and the change in position 33 of each atom being used in auxiliary training of an auxiliary attention head 47B of the transformer-based graph neural network 14, as discussed in detail below in relation to FIG. 3. The ground truth value of the change in position 33 of each atom in the training data set 16 may be calculated by a DFT calculation program 19, which is computed to output an equilibrium graph structure 19A, for example, in a chemical-data file format known as the Structural Data File (SDF) format. The DFT calculation program 19 may further be configured to output ground truth for the HOMO-LUMO energy gap 40.

Figure 2:
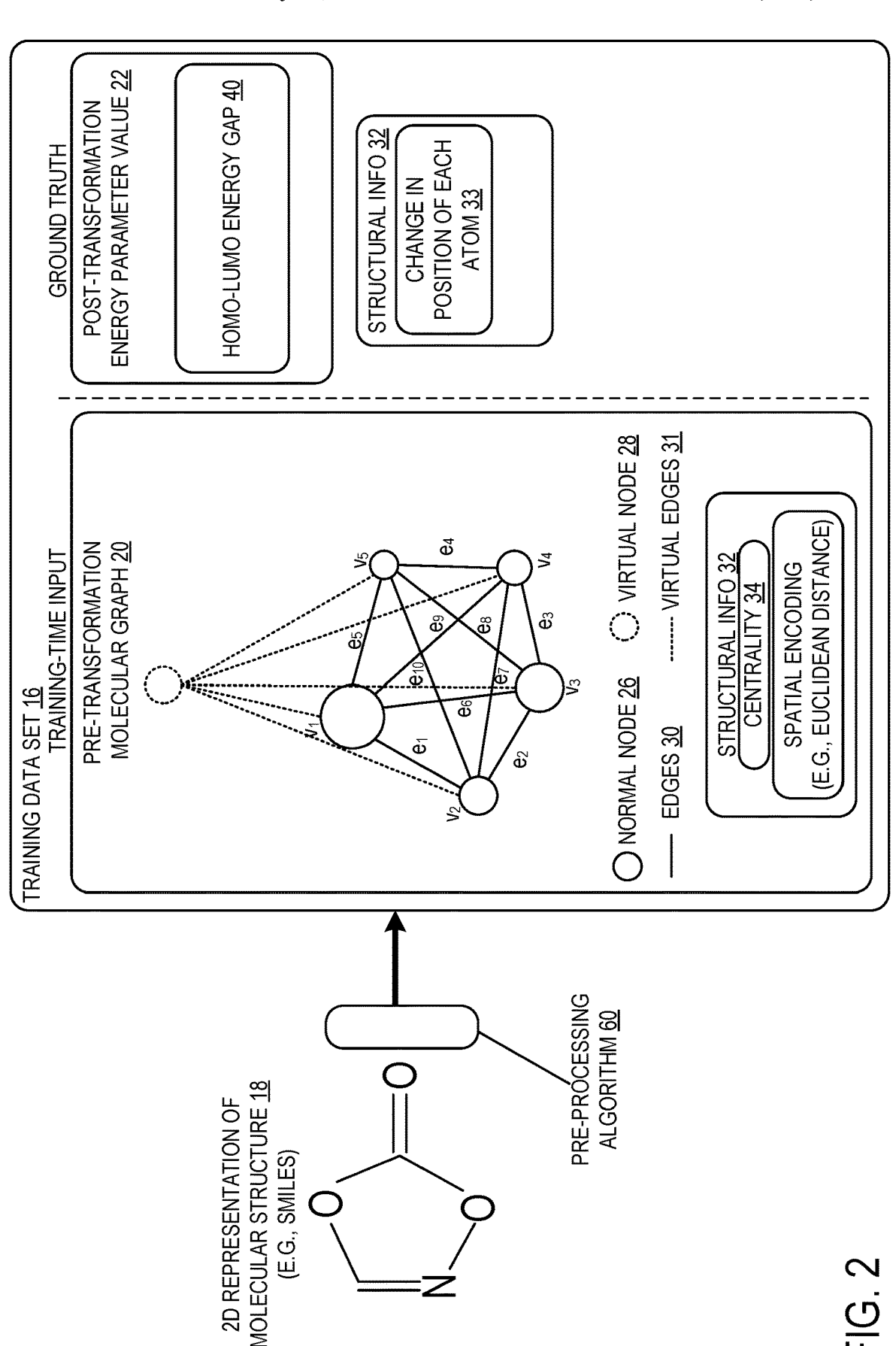
FIG. 2 shows a schematic view of an example of the training data set of FIG. 1, including a pre-transformation molecular graph and post-transformation energy parameter value, in which the pre-transformation molecular graph includes a plurality of normal nodes connected by edges and each normal node represents an atom in the molecular system.

Turning briefly to FIG. 2, the training data set 16 is further explained. FIG. 2 shows a schematic view of an example of the training data set 16 of FIG. 1, including the pre-transformation molecular graph 20 and post-transformation energy parameter value 22. As shown, the pre-transformation molecular graph 20 includes a plurality of normal nodes 26 connected by edges 30. Typically, the plurality of normal nodes 26 are fully connected to each other by edges 30. Each normal node 26 represents an atom in the molecular system. As discussed briefly above, the pre-transformation molecular graph 20 is created based on a 2D representation of molecular structure 18, such as SMILES, via a pre-processing algorithm 60. Each pre-transformation molecular graph 20 further includes one virtual node 28 fully connected by virtual edges 31 to all normal nodes 26 of the respective pre-transformation molecular graph 20. Thus, the pre-transformation molecular graph 20 is a complete graph with all nodes connected by unique edges to all other nodes. It will be appreciated that the difference between the virtual node 28 and normal nodes 26 is that the normal nodes represent atoms whereas the virtual node is provided for computation purposes only, and does not represent any physical component of the molecular system. Other detail regarding the design principles of the virtual node is discussed above. In the depicted example, the pre-transformation molecular graph 20 includes five normal nodes representing atoms ($v_1$, $v_2$, $v_3$, $v_4$, $v_5$) fully connected by edges 30 ($e_1$, $e_2$, $e_3$, $e_4$, $e_5$, $e_6$, $e_7$, $e_8$, $e_9$, and $e_{10}$). A spatial encoding 36 may represent the Euclidean distance along each edge 30 between each pair of atoms represented by the normal nodes 26, as describe below. The pre-transformation molecular graph 20 further includes one virtual node 28 fully connected via the virtual edges 31 to each normal node ($v_1$, $v_2$, $v_3$, $v_4$, $v_5$).

Turning back to FIG. 1, the processor 12 is further configured to encode structural information 32, which describes the relative positions of the atoms represented by the normal nodes 26, in each pre-transformation molecular graph 20 as learnable embeddings. The encoded structural information 32 is represented as a learnable scalar bias term in a self-attention layer of an encoder 46 of a transformer 44 of the transformer-based graph neural network 14, as discussed below. The self-attention layer is coupled to a first attention head (i.e., primary attention head 47A), and the encoder of the transformer further includes an auxiliary attention head 47B configured to compute attention related to predicting a change in position 33 of at least one of the normal nodes 26 (and typically of each normal node 26) due to the energy transformation.

In the depicted example, the encoded structural information 32 includes a centrality encoding 34 and a spatial encoding 36, as introduced generally above. The spatial encoding 36 may include a three-dimensional Euclidean distance along an edge 30 connecting a pair of the normal nodes 26 in each pre-transformation molecular graph 20. In one example, the spatial encoding includes a three-dimensional Euclidean distance along each edge 30 connecting each pair of the plurality of normal nodes 26 in each pre-transformation molecular graph 20, it being appreciated that the plurality of normal nodes 26 may be a subset of all normal nodes 26 in the pre-transformation molecular graph 20. In another example, the spatial encoding includes a three-dimensional Euclidean distance along every edge 30 connecting every pair of normal nodes 26 in each pre-transformation molecular graph 20. The three-dimensional Euclidean distance may be encoded as a pair of Gaussian basis functions. In one example implementation, the centrality encoding 34 is embedded in (i.e., is provided as an embedding for) at least one of the normal nodes 26 of each pre-transformation molecular graph 20. In one example, the centrality encoding 34 is embedded in each of a plurality of normal nodes 26 in the pre-transformation molecular graph. In another example, the centrality encoding is embedded in every normal node 26 in the pre-transformation molecular graph. The centrality encoding 34 assigned to the at least one normal node 26 (or each of the plurality of normal nodes 26 or every normal node 26) may be at least partially computed by calculating a sum of the three-dimensional Euclidean distances of one or more of the edges connected to other normal nodes 26 in each of the pre-transformation molecular graph 20. In one example, the centrality encoding 34 may be at least partially computed by calculating a sum of the three-dimensional Euclidean distances of each edge connected to other each normal node 26 in each of the pre-transformation molecular graph 20. The centrality encoding 34 may further be calculated by normalizing or averaging the sum of distances as desired. In this way the relative proximity of a normal node 26 to all other normal nodes 26 may be computed.

The processor 12 is further configured to input the training data set 16 to a transformer-based graph neural network 14 to train the transformer-based graph neural network 14 to perform an inference at inference time. Within the training data set 16, there are a plurality of training data pairs, each pair including an instance of the pre-transformation molecular graph 20 and an associated ground truth instance of the post transformation energy parameter value 22 and structural information 32 in the form of a change in position 33 of each atom during relaxation. The pre-transformation molecular graph 20 is put through an embedding layer 42, which produces an embedding representation (i.e., embeddings) of the graph. The embeddings are produced by a program that is configured to convert atomic information in the 2D representation of the molecular structure to a numerical value representing the atomic information. The embedding representation of the pre-transformation molecular graph 20 is fed into an encoder 46 of a transformer 44 of the transformer-based graph neural network 14 to generate an encoded representation in the form of an attention vector. The attention vector generated by the encoder 46 is transmitted to a feed-forward network 48 which includes one or more fully connected hidden layers that perform deep learning based on ground truth output that is received during training. Specifically, the post-transformation energy parameter value 22, which may be a HOMO-LUMO energy gap 40, is supplied to the primary attention head 47A of the transformer 44 of the transformer-based graph neural network 14 as a ground truth output, and the structural information 32, which may include a change in position 33 of each atom, is supplied to the auxiliary attention head 47B as another ground truth output, to train the transformer-based graph neural network 14 in order to output a predicted inference-time post-transformation energy parameter value at an inference time. Following the training phase, the processor of the computing system 10 is further configured to output a trained transformer-based graph neural network 50, which is used at an inference time on the computing system 10 or another suitable computing system.

Figure 3:
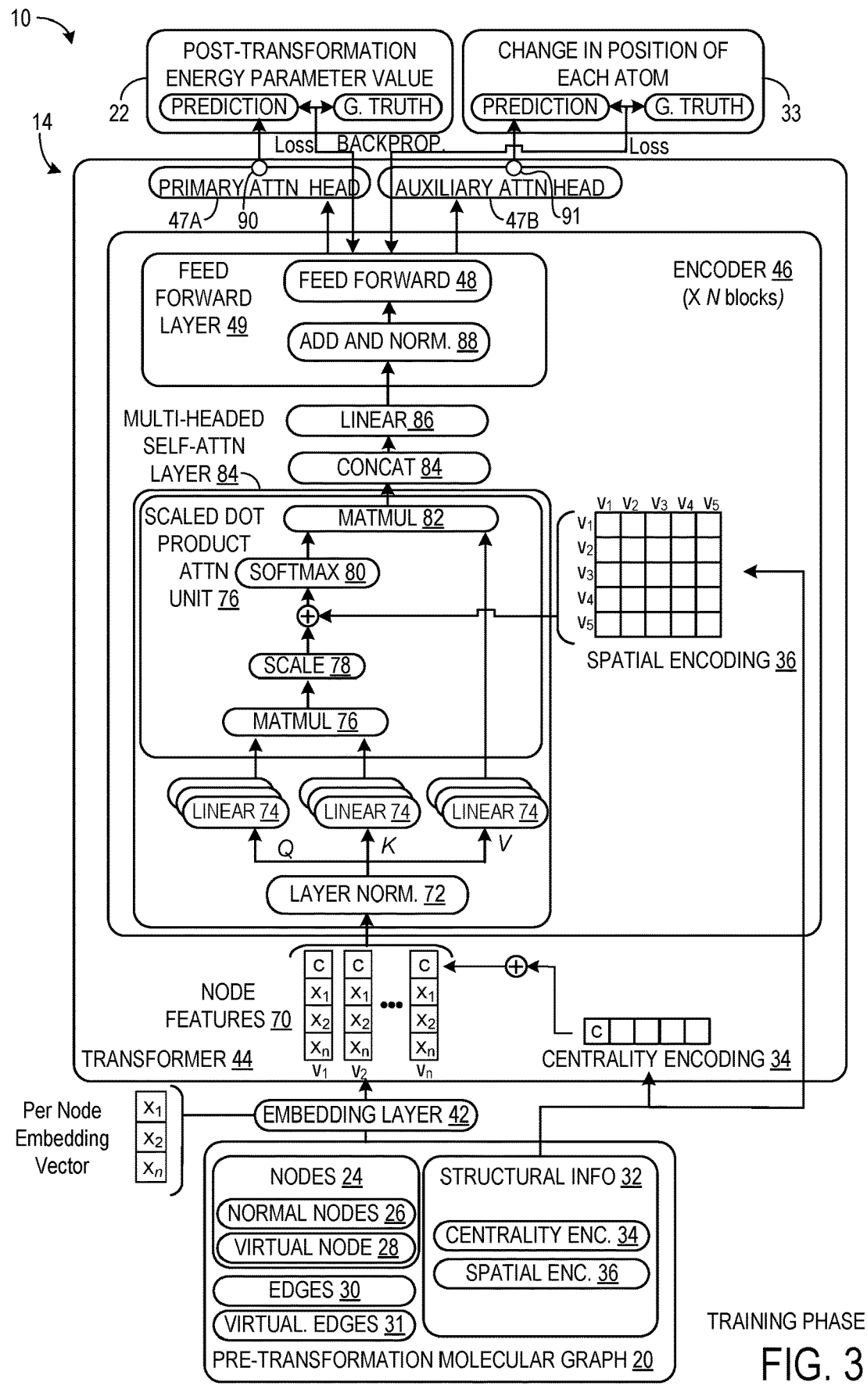
FIG. 3 shows a schematic view of an example internal configuration of a transformer including an encoder and feed forward network, of the transformer-based graph neural network of the system of FIG. 1.

FIG. 3 shows a schematic view of an example internal configuration of the transformer 44 including the encoder 46 of the transformer-based graph neural network 14 of the system of FIG. 1. As shown in FIG. 3, nodes 24 of the pre-transformation molecular graph are passed through the embeddings layer 42, which generates a vector of embeddings for each node. The structural information 32 is already expressed in a parameterized form and thus is not converted to embeddings by the embeddings layer. Rather the structural information 32 is passed to the encoder 46 in its encoded numeric form. It will be appreciated that within structural information 32, centrality encodings 34 are node-wise structural information, that is, are computed on a per-node basis. For this reason, the centrality encoding 34 for each node is concatenated to the embedding vector for that respective node, thereby creating a concatenated vector of node features 70. The spatial encodings 36, which represent Euclidean distances between nodes, are not node-wise information, and for this reason are inputted into the scalar dot product unit 76 within the multi-headed self-attention layer 84. The node features 70 are passed through a normalization layer 72 before passing through a linear projection layer 74 in which vectors for queries Q, keys K, and values V are projected into the matrix multiplication layer 76, which in turn performs dot product multiplication on the keys and query values. Such a configuration is referred to as a Pre-LN configuration because the layer normalization occurs before the multi-headed self-attention layer 84. An alternatively configuration is referred to as Post-LN, and replaces the layer normalization 72 shown in solid lines with the layer normalization shown in dashed lines, after the feed forward layer 49. Advantage of each are discussed below. The output is then scaled by scaling layer 78 and appended with spatial encodings 36 before being passed through softmax layer 80. Finally, the linear projection of the values vector is multiplied by dot product multiplication with the output of the softmax layer 80 in the matrix multiplication layer 82, to produce the output of the scaled dot product attention unit 76. This process occurs in parallel for each attention head of the multiple attention heads, and the results of all attention heads are concatenated in concatenation layer 84 and their linear projection is transmitted to the addition and normalization layer 88 of feed forward layer 49, and then again to the feed forward neural network 48. The output of the feed forward neural network 48 is routed through a regressor node 90 of primary attention head 47A, the regressor node 90 being configured to output a scalar value (e.g., HOMO-LUMO energy gap 40). This scalar value is a prediction of the post-transformation energy parameter value. It will be appreciated that during training, the prediction of the scalar value output from the primary attention head 47A is compared to ground truth for the scalar value, and a loss function is used to train the feed forward network 48 of the transformer-based graph neural network 14 using a suitable backpropagation algorithm. In addition, auxiliary attention head 47B is configured to output a prediction for another scalar value (e.g., change in position 33), via regressor node 91. The change in position may be represented as:

$$\vec{r}_{t,t_{final}=post}-\mathrm{pos}_{t_{final}}$$

Further, the attention function of the auxiliary attention head may be expressed as:

$$Attn_{3D}(q_s, k_t, v_t) = \left(Softmax\left(\frac{q_s W^Q (k_t W^K)^T}{\sqrt{d}}\right) \cdot \frac{\vec{r}_{st}}{d_{st}} v_t W^V\right)$$

The prediction of the scalar value output from the auxiliary attention head 47B is likewise compared to ground truth for the scalar value, and a loss function is used to train the feed forward network 48 of the transformer-based graph neural network 14 using the backpropagation algorithm. The multi-headed self-attention layer 84 and feed forward layer 49 form one block of encoder 46, and it will be appreciated that multiple blocks of encoder 46 may be chained together. It will be appreciated that the output of the auxiliary attention head 47B is used during the training phase to improve accuracy of the training, taking advantage of the additional signal information in the change in position 33 data; however, the auxiliary attention head 47B is not used during the inference phase.

Figure 4:
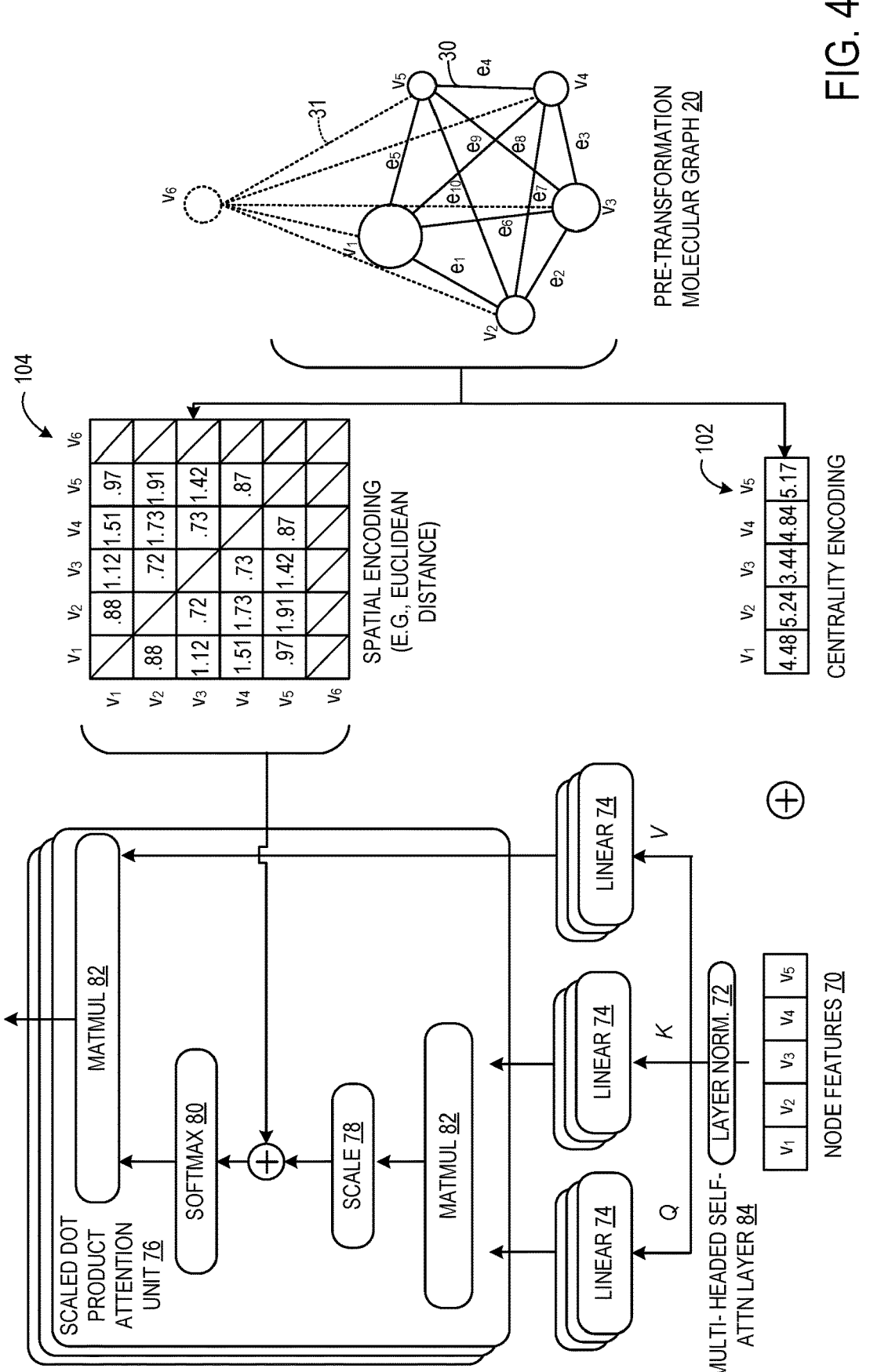
FIG. 4 shows a schematic view of structural information in the form of centrality encoding and spatial encoding, being fed into the transformer-based graph neural network of the system of FIG. 1.

FIG. 4 illustrates a detailed schematic view with example values for the centrality encodings 34 and spatial encodings 36, which are fed into the multi-headed self-attention layer 84 of the encoder 46 of FIG. 3. In the depicted example, the pre-transformation molecular graph 20 includes five normal nodes 26 ($v_1$, $v_2$, $v_3$, $v_4$, $v_5$) fully connected by edges 30 ($e_1$, $e_2$, $e_3$, $e_4$, $e_5$, $e_6$, $e_7$, $e_8$, $e_9$, and $e_{10}$) and one virtual node ($v_6$) fully connected to each normal node 26 by virtual edges 31. As shown in in example spatial encoding vector 104, the spatial encoding 36, which may represent the Euclidean distance along the edges between each pair of normal nodes 26, is computed for $v_1$, $v_2$, $v_3$, $v_4$, and $v_5$. The spatial encoding 36 and edge coding 38 for $v_6$ is not computed since $v_6$ is the virtual node 28. The units for the Euclidean distances may be in Angstrom. As shown in example centrality encoding vector 102, the centrality encoding is computed as 4.48, 5.24, 3.44, 4.84, and 5.17 for $v_1$, $v_2$, $v_3$, $v_4$, and $v_5$ respectively, which respectively total the values shown in each column of the spatial encoding vector 104. As discussed above, the structural information 32 is fed into the multi-headed self-attention layer 84 of the encoder 46, with node-wise centrality encodings 34 being concatenated to the vector of node features 70 and the spatial encodings 36 being concatenated to the scaled product of the query and key attention vectors, prior to softmax layer 80 in the scaled dot product attention unit 76 of the multi-headed attention layer 84. Doing so increases the parameter space of the attention vector, enabling the model to attend to the structural features as well as the node-specific features such as atom type, etc.

in the pre-transformation molecular graph 20 during deep learning. This increases the expressiveness of the model.

FIG. 5 is a schematic illustration of a molecular system 110 with a periodically repeating structure 112, such as a 2D or 3D lattice structure. A pre-transformation molecular graph 20 representing such a periodically repeating structure 112 typically represents at least the smallest repeating unit 114 of the periodically repeating structure 112. To achieve this but not overburden the processor with computational load, the pre-transformation molecular graph 20 is constructed according to an enforced periodic boundary condition 116, so as to include at least nodes in the smallest repeating unit 114. In one example, a maximum threshold distance (illustrated as radius r), such as 8 angstroms, may be evaluated on a node-wise basis, and a union of all the nodes less than or equal to the threshold distance of each node in the smallest repeating unit may be included as within (i.e., meeting) the periodic boundary condition. Of course, 8 angstroms is merely an example, and a different threshold may alternatively be set. Thus, the enforced periodic boundary condition 116 may be set based on a maximum threshold distance for the three-dimensional Euclidean distance between pairs of nodes included in the pre-transformation graph 20, such that all pairs of nodes in each pre-transformation graph 20 are separated from each other by a three-dimensional Euclidean distance that is less than or equal to the maximum threshold distance. In the figure, two spheres 116A, 116B having radius r are shown surrounding respective nodes in the smallest repeating unit, and the periodic boundary condition 116 is comprised of all nodes within those spheres. While the periodic boundary condition 116 is shown to be significantly larger than the smallest repeating unit 114, it may be as small as desired so long as it still encompasses the smallest repeating unit 114.

Figure 6:
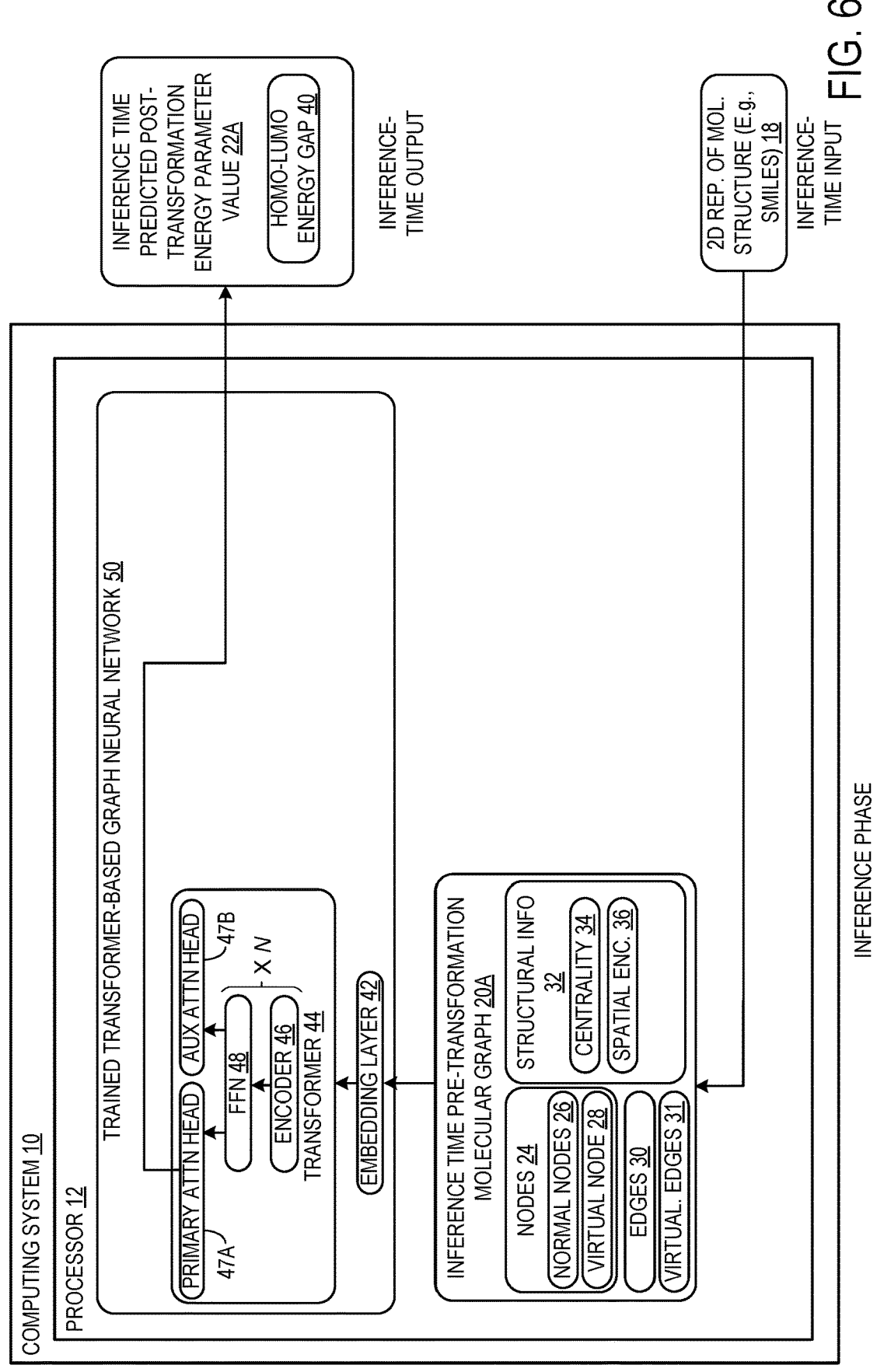
FIG. 6 shows a schematic view of a computing system including a trained transformer-based graph neural network configured to, during an inference phase, predict an inference-time post-transformation energy parameter value based on an inference-time pre-transformation molecular graph input via the trained transformer-based graph neural network of the computing system of FIG. 1.

FIG. 6 shows a schematic view of a computing system 10 including a trained transformer-based graph neural network 50 that has been trained by the methods heretofore discussed, to be configured to, during an inference phase, predict an inference-time post-transformation energy parameter value 22A based on an inference-time pre-transformation molecular graph 20A input via the trained transformer-based graph neural network 50 of the computing system 10 of FIG. 1. To perform the inference at inference time, the processor is configured to receive inference-time input of an inference-time pre-transformation molecular graph 20A at the transformer-based graph neural network 50, process the inference-time input, and output the inference-time post-transformation energy parameter value 22A, which may be the HOMO-LUMO energy gap 40 as discussed above, based on the inference-time pre-transformation molecular graph 20A. The structural information 32 including the centrality encoding 32 and spatial encoding 36 is encoded in the inference-time pre-transformation molecular graph 20A. The inference-time pre-transformation molecular graph 20A including the structural information 32 is first put through an embeddings layer 42 to convert the nodes into embeddings, which in turn are concatenated with the node-wise centrality encoding 34 as discussed above, prior to input into transformer 44. The concatenated vector of node features (including the embeddings and centrality encodings) is fed into an encoder 46 of the transformer 44 of the trained transformer-based graph neural network 50, which also receives the spatial encoding 36. In turn, the trained transformer-based graph neural network 50 outputs a predicted inference-time post-transformation energy parameter value 22A representing, for example, a HOMO-LUMO energy gap 40.

Technical advantages of the configuration of the transformer-based graph neural network 14 discussed herein will now be explained. First, the architecture described herein has been shown to offer superior expressiveness as compared to conventional GNN models that merely use AGGREGATE and COMBINE steps, by choosing proper weights and distance function φ. The reason for this is that the spatial encoding described herein enables the self-attention function to distinguish the neighbor set $N(v_i)$ of node $v_i$ so that the softmax function can calculate mean statistics over $N(v_i)$. Further, by knowing the centrality of a node due to its centrality encoding, the mean over neighbors can be translated to the sum over neighbors. With the multiple heads in the self-attention layer and the feed forward network, representations of $v_i$ and $N(v_i)$ can be processed separately and combined together downstream. Further by using the spatial encoding described herein (e.g., three-dimensional Euclidean distance), the transformer-based graph neural network described herein can exceed the results of conventional message passing GNNs whose expressive power is no more than the 1-Weisfeiler-Lehman (WL) test, enabling systems built according to the present disclosure to distinguish graphs that the 1-WL test cannot.

In addition to the improved expressiveness as compared to conventional GNNs, the use of self-attention and the virtual node can significantly improve the performance of existing GNNs. Conceptually, the benefit of the virtual node is that it can aggregate the information of the whole graph and then propagate it to each node. However, a naive addition of a fully connected virtual node to a graph can potentially lead to inadvertent over-smoothing of information propagation. The approach described herein instead demonstrates that such a graph-level aggregation and propagation operation can be naturally fulfilled by a self-attention layer as described herein without additional encodings. Due to the self-attention that each node can attend to all other nodes, the graph can simulate a graph-level READOUT operation to aggregate information from the entire graph. Further, the disclosed configurations do not encounter the problem of over-smoothing, which makes the improvement scalable. A predetermined node for graph readout may be provisioned to take advantage of this.

Experimental Results

Table 1 in FIG. 7 shows the results of a first experiment related to molecular property prediction. The experiment was conducted on the large-scale molecular graph dataset PCQM4M, which contains 3.8M graphs and 55.4M edges in total. PCQM4M is a quantum chemistry dataset that has been prepared with the aim of accelerating quantum physical property calculation based on the Density Functional Theory (DFT) by advanced machine learning methods. The second version (v2) of this dataset was updated with several modifications and 3D molecular structures. In this section, the performance on both versions of the dataset (v1 and v2) is reported, but without using any 3D geometric information. In Table 1, the system of FIG. 1 is referred to as GRAPHORMER.

The experiment was conducted with the following settings. A variant of the transformer-based graph neural network of the present disclosure was configured with a 12-layer model (GRAPHORMERBase), as follows:

1. GRAPHORMERBase: L=12, d=768, H=32, where d and H represent the hidden dimension and the number of attention heads, respectively. Two versions of this model were compared with each other: PreLNBase having a Pre-LN configuration and PostLNBase having a Post-LN configuration. From Table 1, it can be seen that the Post-LN variant could attain better performance than Pre-LN on the large-scale molecular property prediction task for GRAPHORMERBase.

Table 2 in FIG. 8 shows the results of a second experiment related to molecular dynamics simulation. The dataset for this experiment was the electrocatalysts dataset available in the Open Catalyst 2020 (OC20). The dataset was prepared with the aim of accelerating the catalyst discovery process for solar fuels synthesis, long-term energy storage, and renewable fertilizer production, by using machine learning models to find low-cost electrocatalysts to drive the electrochemical reactions at high rates. The OC20 dataset contains more than 660 k catalyst-adsorbate reaction systems (over 140M structure-energy estimations) produced by molecular dynamics simulation using DFT. In Table 2, the system of FIG. 1 is also referred to as GRAPHORMER. Table 2 includes a summary of results of GRAPHORMER for predicting the relaxed energies of molecular systems from initial structures, i.e., the pre-transformation state of the molecular structure.

In this experiment, a 12-layer model (GRAPHORMER-Base) was used as the basic model for energy prediction. The outputs were repeatedly fed to this basic model four times in series, which contributed markedly to accuracy with minor extra training time. The model was optimized using Adam with a learning rate of 3e-4 and weight decay of 1e-3. The model was trained using a batch size of 64 for 1 million steps.

In addition to predicting the relaxed energy of the entire molecular system, an auxiliary node-level objective to predict the displacement of each atom between the initial and relaxed structures was used, in the form of the auxiliary attention head discussed above. In Table 2, the performance of the model on the IS2RE Direct track, which directly estimates the relaxed energy from the initial structure, is shown. As shown in Table 2, the energy prediction of unseen element compositions for catalysts (Out of Domain (OOD) Catalyst) is much more accurate than OOD Adsorbates, and OOD Both, which implies that the GRAPHORMER model may have the potential to help the catalyst discovery process for well-known but important chemical species involved in the chemical reactions of interest, such as OH, O2, or H2O. In Table 2, it will be noted that * denotes evaluation on the OC20 validation split.

As discussed above, the systems and methods described herein have applicability outside of the field of computational chemistry, on graphs in general, which encode structural information about the data they represent in their structure. In such a case, the processor described above may be configured to, more generally, during a training phase, provide a training data set including a plurality of training data pairs, each of the training data pairs including a pre-transformation graph and post-transformation parameter value representing a change in a system modeled by the pre-transformation graph following a transformation. The pre-transformation graph may include a plurality of normal nodes connected by edges, each normal node representing a location in the system. The processor may be configured to encode structural information in each pre-transformation graph as learnable embeddings, the structural information describing the relative positions of the locations represented by the normal nodes. The structural information may include a spatial information, including a three-dimensional Euclidean distance along an edge (typically each edge) connecting a pair (typically each pair) of the normal nodes in each pre-transformation molecular graph. The processor may further be configured to input the training data set to a transformer-based graph neural network to thereby train the transformer-based graph neural network to perform an inference at inference time. In one particular example, the pre-transformation graph may be a social graph that models a social network of friends. In such an example, the post-transformation parameter value may be an affinity ranking between two users of the social network. In another example, the pre-transformation graph may be a map that models a network of locations connected by roads or railways or other travelways. In this example, the post-transformation parameter value may be a ranking value of a route between two locations on the map. In another example, the pre-transformation graph may be a knowledge graph that models knowledge sources connected by references, and the post-transformation parameter value may be an influence score indicating relative influence of a knowledge source on the graph.

FIG. 9 shows a flowchart of a computerized method 300 according to one example implementation of the present disclosure. Method 300 may be implemented by the hardware and software of computing system 10 described above, or by other suitable hardware and software. At step 302, the method 300 may include, during a training phase, providing a training data set including a plurality of training data pairs, each of the training data pairs including a pre-transformation molecular graph and post-transformation energy parameter value representing an energy change in a molecular system following an energy transformation, wherein the pre-transformation graph includes a plurality of normal nodes connected by edges, each normal node representing an atom in the molecular system. As indicated at 303, each molecular graph further includes one virtual node fully connected by virtual edges to all normal nodes of the respective pre-transformation molecular graph.

At step 304, the method may further include encoding structural information in each pre-transformation molecular graph as learnable embeddings, in which the structural information describes the relative positions of the atoms represented by the normal nodes. As shown at 306, the structural information may include a spatial encoding representing a Euclidean distance along an edge (in one example, each edge) between a pair (in one example, each pair) of normal nodes in each pre-transformation molecular graph. The three-dimensional Euclidean distance may be encoded as a pair of Gaussian basis functions. Further as indicated at 310, the structural information may include a centrality encoding for at least one normal node (in one example, each normal node) of each pre-transformation molecular graph. The centrality encoding may be at least partially computed by calculating a sum of the three-dimensional Euclidean distances of each edge connected to each node in each of the pre-transformation molecular graph.

At step 312, the method may further include inputting training data set to a transformer-based graph neural network to train the transformer-based graph neural network to infer a post-transformation molecular graph based on an inference-time input of a pre-transformation molecular graph.

At step 314, the method may further include, to perform the inference at inference-time, receiving inference-time input of an inference-time pre-transformation molecular graph at the transformer-based graph neural network. At step 316, the method may further include outputting the inference-time post-transformation energy parameter value based on the inference-time pre-transformation molecular graph.

As discussed above, and according to the method, the molecular system may have a periodically repeating structure, such as is evident in a 2D or 3D lattice, and each of the pre-transformation molecular graphs may represent at least a smallest repeating unit of the periodically repeating structure. Each pre-transformation molecular graph may be being constructed according to an enforced boundary condition so as to include at least nodes in the smallest repeating unit of the periodically repeating structure. Further, according to the method, the enforced boundary condition is a maximum threshold distance for the three-dimensional Euclidean distance such that all pairs of nodes in each graph are separated from each other by a three-dimensional Euclidean distance that is less than or equal to the maximum threshold distance. Finally, as discussed above, it will be appreciated that the encoded structural information may be represented as a learnable scalar bias term in a self-attention layer of an encoder of the transformer of the transformer-based graph neural network, wherein the self-attention layer is coupled to a first attention head. And, the encoder of the transformer may further include an auxiliary attention head configured to compute attention related to predicting a change in position of each node due to the energy transformation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
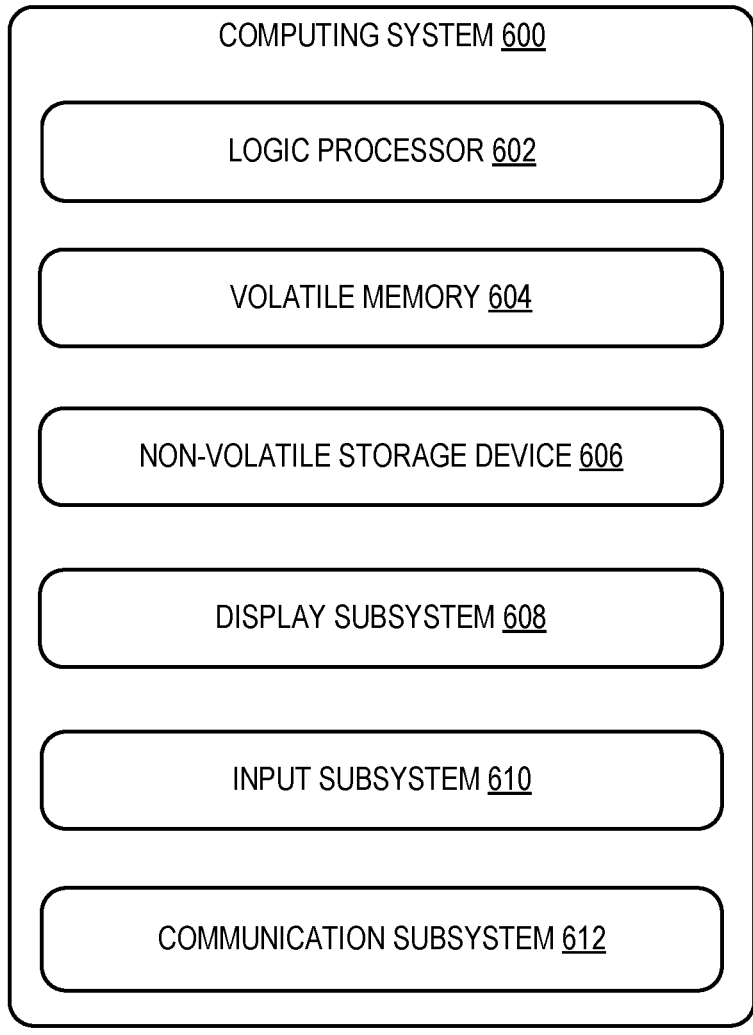
FIG. 10 shows an example computing environment according to which the embodiments of the present disclosure may be implemented.

FIG. 10 schematically shows a non-limiting embodiment of a computing system 600 that can enact one or more of the methods and processes described above. Computing system 600 is shown in simplified form. Computing system 600 may embody the computer system 10 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display sub system 608, input sub system 610, communication sub system 612, and/or other components not shown in FIG. 10.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs discuss several aspects of the present disclosure. According to one aspect of the present disclosure, a computing system is provided. The system may include a processor configured to, during a training phase, provide a training data set including a plurality of training data pairs, each of the training data pairs including a pre-transformation molecular graph and post-transformation energy parameter value representing an energy change in a molecular system following an energy transformation, in which the pre-transformation molecular graph includes a plurality of normal nodes fully connected by edges, and each normal node represents an atom in the molecular system. The processor may be further configured to encode structural information in each molecular graph as learnable embeddings, in which the structural information describes the relative positions of the atoms represented by the normal nodes. The structural information may include a three-dimensional Euclidean distance along an edge connecting a pair of the normal nodes in each pre-transformation molecular graph. The processor may be further configured to input the training data set to a transformer-based graph neural network to thereby train the transformer-based graph neural network to perform an inference at inference time. To perform the inference at inference time, the processor may be further configured to receive inference-time input of the inference-time pre-transformation molecular graph at the trained transformer-based graph neural network, and output the inference-time post-transformation energy parameter value based on the inference-time pre-transformation molecular graph.

According to this aspect, the three-dimensional Euclidean distance may be encoded as a pair of Gaussian basis functions.

According to this aspect, the encoded structural information may include a centrality encoding for at least one of the normal nodes of each pre-transformation molecular graph.

According to this aspect, the centrality encoding may be at least partially computed by calculating a sum of the three-dimensional Euclidean distances of one or more edges connected to other nodes in each of the pre-transformation molecular graphs.

According to this aspect, the molecular system may have a periodically repeating structure, and the molecular graphs may represent at least a smallest repeating unit of the periodically repeating structure, the molecular graphs being constructed according to an enforced boundary condition so as to include at least nodes in the smallest repeating unit.

According to this aspect, the enforced boundary condition may be a maximum threshold distance for the three-dimensional Euclidean distance such that all pairs of normal nodes in each graph may be separated from each other by a three-dimensional Euclidean distance that is less than or equal to the maximum threshold distance.

According to this aspect, the energy transformation may be due to molecular relaxation of the molecular system.

According to this aspect, the encoded structural information may be represented as a learnable scalar bias term in a self-attention layer of an encoder of the transformer of the transformer-based graph neural network.

According to this aspect, the self-attention layer may be associated with a first attention head, the encoder of the transformer further including an auxiliary attention head configured to compute attention related to predicting a change in position of at least one of the normal nodes due to the energy transformation.

According to this aspect, each pre-transformation molecular graph may further include one virtual node fully connected by virtual edges to all normal nodes of the respective pre-transformation molecular graph.

According to another aspect of the present disclosure, a computerized method is provided. The computerized method may include, during a training phase, providing a training data set including a plurality of training data pairs, each of the training data pairs including a pre-transformation molecular graph and post-transformation energy parameter value representing an energy change in a molecular system following an energy transformation, in which the pre-transformation molecular graph includes a plurality of normal nodes fully connected by edges, and each normal node represents an atom in the molecular system. The computerized method may further include encoding structural information in each molecular graph as learnable embeddings, in which the structural information describes the relative positions of the atoms represented by the normal nodes. The structural information may include a three-dimensional Euclidean distance along an edge connecting a pair of the normal nodes in each pre-transformation molecular graph. The computerized method may further include inputting the training data set to a transformer-based graph neural network to thereby train the transformer-based graph neural network to perform an inference at inference time. To perform the inference at inference time, the computerized method may further include receiving inference-time input of the inference-time pre-transformation molecular graph at the trained transformer-based graph neural network, and outputting the inference-time post-transformation energy parameter value based on the inference-time pre-transformation molecular graph.

According to this aspect, the three-dimensional Euclidean distance may be encoded as a pair of Gaussian basis functions.

According to this aspect, the encoded structural information may include a centrality encoding for at least one normal node of each pre-transformation molecular graph, in which the centrality encoding may be at least partially computed by calculating a sum of the three-dimensional Euclidean distances of one or more edges connected to other nodes in each of the pre-transformation molecular graphs.

According to this aspect, the molecular system may have a periodically repeating structure, and the molecular graphs may represent at least a smallest repeating unit of the periodically repeating structure, in which the molecular graphs are constructed according to an enforced boundary condition so as to include at least nodes in the smallest repeating unit.

According to this aspect, the enforced boundary condition may be a maximum threshold distance for the three-dimensional Euclidean distance such that all pairs of nodes in each graph may be separated from each other by a three-dimensional Euclidean distance that is less than or equal to the maximum threshold distance.

According to this aspect, the encoded structural information may be represented as a learnable scalar bias term in a self-attention layer of an encoder of the transformer of the transformer-based graph neural network, in which the self-attention layer may be coupled to a first attention head, and the encoder of the transformer may further include an auxiliary attention head configured to compute attention related to predicting a change in position of at least one of the normal nodes due to the energy transformation.

According to another aspect of the present disclosure, a computing system is provided. The system may include a processor configured to, during a training phase, provide a training data set including a plurality of training data pairs, each of the training data pairs including a pre-transformation graph and post-transformation parameter value representing a change in a system modeled by the pre-transformation graph following a transformation, in which the pre-transformation graph may include a plurality of normal nodes connected by edges, and each normal node may represent a location in the system. The processor may be further configured to encode structural information in each pre-transformation graph as learnable embeddings, in which the structural information may describe the relative positions of the locations represented by the normal nodes. The structural information may include a three-dimensional Euclidean distance along an edge connecting a pair of the normal nodes in each pre-transformation molecular graph. The processor may be further configured to input the training data set to a transformer-based graph neural network to thereby train the transformer-based graph neural network to perform an inference at inference time.

According to this aspect, the pre-transformation graph may be a social graph that models a social network of friends, a map that models a network of locations connected by roads or railways, or a knowledge graph that models knowledge sources connected by references.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor configured to:
during a training phase,
provide a training data set including a plurality of training data pairs, each of the training data pairs including a pre-transformation molecular graph and post-transformation energy parameter value representing an energy change in a molecular system following an energy transformation, wherein the pre-transformation molecular graph includes a plurality of normal nodes fully connected by edges, each normal node representing an atom in the molecular system;
encode structural information in each molecular graph as learnable embeddings, the structural information describing the relative positions of the atoms represented by the normal nodes, the structural information including a spatial encoding for each edge connecting a pair of the normal nodes in each pre-transformation molecular graph that represents a three-dimensional Euclidean distance along the respective edge connecting each pair of the normal nodes and a node-wise centrality encoding for each of the normal nodes of each pre-transformation molecular graph; and
input the training data set to a transformer-based graph neural network to thereby train the transformer-based graph neural network to, at inference time, output an inference-time post-transformation energy parameter value that indicates one or more physical or chemical properties of the molecular system, wherein
the node-wise centrality encoding is concatenated to a node embedding for each node and input into an embedding layer of the transformer-based graph neural network, and the spatial encoding is combined with a scaled product of query and key attention vectors computed from the concatenated node embedding and centrality encodings for each node in a scaled dot product attention unit of the transformer-based graph neural network.

2. The computing system of claim 1, wherein the three-dimensional Euclidean distance is encoded as a pair of Gaussian basis functions.

3. The computing system of claim 1, wherein, at inference time, the processor is further configured to:
receive inference-time input of the inference-time pre-transformation molecular graph at the trained transformer-based graph neural network, and
output the inference-time post-transformation energy parameter value based on the inference-time pre-transformation molecular graph.

4. The computing system of claim 1, wherein the node-wise centrality encoding is at least partially computed by calculating a sum of the three-dimensional Euclidean distances of one or more of the edges connected to other normal nodes in each of the pre-transformation molecular graphs.

5. The computing system of claim 1, wherein the molecular system has a periodically repeating structure, and the molecular graphs represent at least a smallest repeating unit of the periodically repeating structure, the molecular graphs being constructed according to an enforced boundary condition so as to include at least nodes in the smallest repeating unit.

6. The computing system of claim 5, wherein the enforced boundary condition is a maximum threshold distance for the three-dimensional Euclidean distance such that all pairs of normal nodes in each graph are separated from each other by a three-dimensional Euclidean distance that is less than or equal to the maximum threshold distance.

7. The computing system of claim 1,
wherein the energy transformation is due to molecular relaxation of the molecular system.

8. The computing system of claim 1, wherein the encoded structural information is represented as a learnable scalar bias term in a self-attention layer of an encoder of the transformer of the transformer-based graph neural network.

9. The computing system of claim 8, wherein the self-attention layer is associated with a first attention head, the encoder of the transformer further including an auxiliary attention head configured to compute attention related to predicting a change in position of at least one of the normal nodes due to the energy transformation.

10. The computing system of claim 1, wherein each pre-transformation molecular graph further includes one virtual node fully connected by virtual edges to all normal nodes of the respective pre-transformation molecular graph.

11. A computerized method, comprising:
during a training phase,
providing a training data set including a plurality of training data pairs, each of the training data pairs including a pre-transformation molecular graph and post-transformation energy parameter value representing an energy change in a molecular system following an energy transformation, wherein the pre-transformation molecular graph includes a plurality of normal nodes fully connected by edges, each normal node representing an atom in the molecular system;
encoding structural information in each molecular graph as learnable embeddings, the structural information describing the relative positions of the atoms represented by the normal nodes, the structural information including a spatial encoding for each edge connecting a pair of the normal nodes in each pre-transformation molecular graph that represents a three-dimensional Euclidean distance along the respective edge connecting each pair of the normal nodes and a node-wise centrality encoding for each of the normal nodes of each pre-transformation molecular graph; and
inputting the training data set to a transformer-based graph neural network to thereby train the transformer-based graph neural network to, at inference time, output an inference-time post-transformation energy parameter value that indicates one or more physical or chemical properties of the molecular system, wherein
the node-wise centrality encoding is concatenated to a node embedding for each node and input into an embedding layer of the transformer-based graph neural network, and the spatial encoding is combined with a scaled product of query and key attention vectors computed from the concatenated node embedding and centrality encodings for each node in a scaled dot product attention unit of the transformer-based graph neural network.

12. The computerized method of claim 11, wherein the three-dimensional Euclidean distance is encoded as a pair of Gaussian basis functions.

13. The computerized method of claim 11, further comprising:

at inference time, receiving inference-time input of the inference-time pre-transformation molecular graph at the trained transformer-based graph neural network, and outputting the inference-time post-transformation energy parameter value based on the inference-time pre-transformation molecular graph.

14. The computerized method of claim 13, wherein the node-wise centrality encoding is at least partially computed by calculating a sum of the three-dimensional Euclidean distances of one or more edges connected to other nodes in each of the pre-transformation molecular graphs.

15. The computerized method of claim 11, wherein the molecular system has a periodically repeating structure, and the molecular graphs represent at least a smallest repeating unit of the periodically repeating structure, the molecular graphs being constructed according to an enforced boundary condition so as to include at least nodes in the smallest repeating unit.

16. The computerized method of claim 15, wherein the enforced boundary condition is a maximum threshold distance for the three-dimensional Euclidean distance such that all pairs of normal nodes in each graph are separated from each other by a three-dimensional Euclidean distance that is less than or equal to the maximum threshold distance.

17. The computerized method of claim 11, wherein the encoded structural information is represented as a learnable scalar bias term in a self-attention layer of an encoder of the transformer of the transformer-based graph neural network, wherein the self-attention layer is coupled to a first attention head, and the encoder of the transformer further including an auxiliary attention head configured to compute attention related to predicting a change in position of at least one of the normal nodes due to the energy transformation.

18. A computing system, comprising:

a processor configured to:

during a training phase, provide a training data set including a plurality of training data pairs, each of the training data pairs including a pre-transformation graph and post-transformation parameter value representing a change in a system modeled by the pre-transformation graph following a transformation, wherein the pre-transformation graph includes a plurality of normal nodes connected by edges, each normal node representing a location in the system;

encode structural information in each pre-transformation graph as learnable embeddings, the structural information describing the relative positions of the locations represented by the normal nodes, the structural information including a spatial encoding for each edge connecting a pair of the normal nodes in each pre-transformation graph that represents a three-dimensional Euclidean distance along the respective edge connecting each pair of the normal nodes and a node-wise centrality encoding for each of the normal nodes of each pre-transformation graph; and input the training data set to a transformer-based graph neural network to thereby train the transformer-based graph neural network to, at inference time, wherein the node-wise centrality encoding is concatenated to a node embedding for each node and input into an embedding layer of the transformer-based graph neural network, and the spatial encoding is combined with a scaled product of query and key attention vectors computed from the concatenated node embedding and centrality encodings for each node in a scaled dot product attention unit of the transformer-based graph neural network.

19. The computing system of claim 18, wherein the pre-transformation graph is a social graph that models a social network of friends, a map that models a network of locations connected by roads or railways, or a knowledge graph that models knowledge sources connected by references.

\* \* \* \* \*